Nov. 15, 1966 A. H. ZEFTING 3,286,224
ACOUSTIC DIRECTION FINDING SYSTEM
Filed Feb. 15, 1965
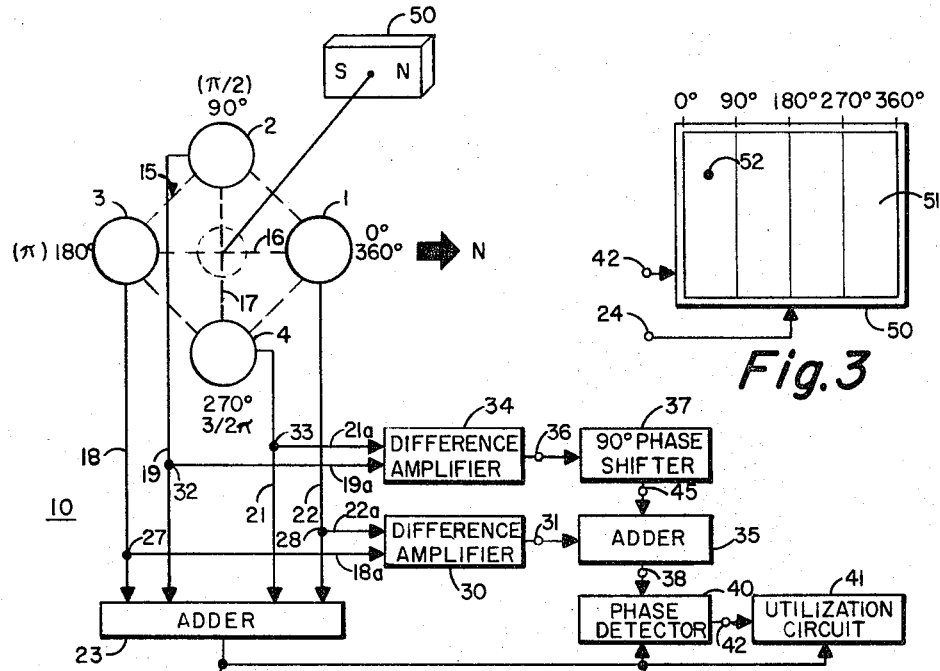
Fig. 1
Fig. 3
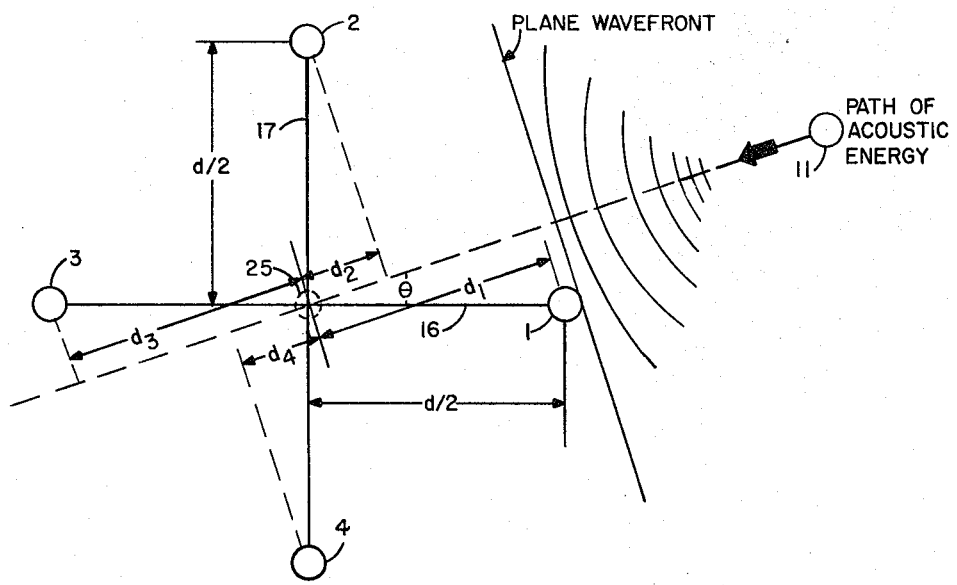
Fig. 2
INVENTOR.
ARTHUR H. ZEFTING
BY Samuel R. Genca
AGENT

United States Patent Office 3,286,224
Patented Nov. 15, 1966

3,286,224
ACOUSTIC DIRECTION FINDING SYSTEM
Arthur H. Zefting, Rochester, N.Y., assignor to General Dynamics Corporation, a corporation of Delaware
Filed Feb. 15, 1965, Ser. No. 432,601
7 Claims. (Cl. 340—6)

The present invention relates to an acoustic system and particularly to an acoustic signal detection system.

Although the present invention is suited for more general applications, it is particularly adapted for the determination of the direction or bearing of incident acoustic energy and the displaying of a derived sonic signal which represents the bearing and magnitude of the incident acoustic energy. The magnitude and direction or bearing of incident acoustic energy in water or other given mediums are important factors in a number of fields such as seismic exploration, anti-submarine warfare, and marine navigation.

Many attempts have been made in the past, particularly in the field of anti-submarine warfare, for quickly and accurately determining the bearing or direction of an underwater sound source or underwater sound-reflecting object. Such attempts include radio sonobuoy systems which may include a plurality of expendable radio sonobuoys which are dropped at sea in a given area of interest. The sonobuoys each include a hydrophone or other such transducer for receiving acoustic energy in the area of interest. At times, as many as eight sonobuoys may be dropped in the given area of interest to determine the range and bearing of a submarine or other sound producing sources. Although advantageous over other known systems for the same purpose, a search with known sonobuoy systems in an area of interest is an expensive and time-consuming operation.

It is therefore an object of the present invention to provide an improve acoustic system particularly suitable for use in underwater sound detection purposes.

It is another object of the present invention to provide a new and improved acoustic system which is adapted for determining the bearing of an underwater sound source or underwater sound-reflecting object, in most instances, in a shorter time than with known systems for the same purpose.

It is still another object of the present invention to provide an acoustic system for determining the bearing or location of an underwater sound source which acoustic system is simple in construction and is less expensive than known systems for a given search in an area of interest.

It is yet another object of the present invention to provide an improved acoustic system which provides a readily comprehensibe visual display of transmitted intelligence used for resolving a position of underwater sound sources or sound reflecting objects.

Briefly described, an acoustic system, according to an embodiment of the present invention, includes an array including four acousto-electric pressure gradient devices, such as hydrophones, for receiving acoustic energy from any direction. The four hydrophones may be supported by a sonobuoy or other suitable structure. The four hydrophones are arranged in quadrature; viz. they are each disposed at a different corner of an imaginary square and spaced a given fractional part of a given wavelength of a given frequency along the diagonals of the imaginary square. Each hydrophone has substantially the same omnidirectional characteristics and sensitivity. The acoustic system further includes a first adder for adding the outputs of all the hydrophones to derive a reference signal or clock standard which appears to emanate from an imaginary or virtual hydrophone disposed at the intersection of the diagonals of the square. The hydrophones disposed along each of the diagonals of the square define two individual pairs of hydrophones. The outputs of the individual pairs of hydrophones are applied to corresponding difference amplifiers to derive two differenced signals. One of the two differenced signals is phase-shifted by ninety degrees (90°) and added to the other differenced signal in a second adder. The outputs from the first and second adder are applied to a phase detector to derive a directional signal which is a function of the bearing of the acoustic signal received by the hydrophone array. The directional signal may be radio transmitted and applied to a utilization circuit such as a chart recorder or a "B" type oscilloscope for displaying the directional signal.

The invention itself, both as to its organization and method of operation, as well as additional objects and advantages thereto, will become more readily apparent from a reading of the following description in connection with the accompanying drawing in which:

FIG. 1 is a simplified block diagram of an acoustic system, including four hydrophones which is illustrative of one embodiment of the invention;

FIG. 2 is a schematic diagram showing the hydrophones of the acoustic system shown in FIG. 1 which is useful in explaining the mode of operation of the system; and FIG. 3 shows an oscilloscope display which may be provided in the utilization circuit shown in FIG. 1.

Referring more particularly to FIGS. 1 and 2, an acoustic system 10 is shown for detecting the bearing (direction or angle) and magnitude of acoustic energy which is transmitted over an underwater path from a sound source 11 (FIG. 2). The acoustic system 10 includes first, second, third and fourth pressure gradient transducers or hydrophones, 1, 2, 3 and 4, respectively, mounted at a listening station in a suitable supporting structure generically represented by a dotted outline of an imaginary square 15. The supporting structure 15 may be, for example, a sonobuoy which supports the four hydrophones 1, 2, 3 and 4 in a horizontal plane when floated in water. The four hydrophones 1, 2, 3 and 4 are disposed at different corners of the imaginary square 15 and are spaced a fractional part $(d)$ of a given wavelength $(\lambda)$ of an operating frequency of the acoustic system 10 along the diagonals 16 and 17 of the imaginary square 15. The fractional part $(d)$ may be, for example, a half wavelength $(\lambda/2)$. The operating frequency of the acoustic system 10 may be in the audio or low frequency and may be in the range of 1 to 10 kc. The system will operate at other fractional parts of a wavelength and operating frequencies so that the above spacing and operating frequency should not be taken as limiting. The first and third hydrophones 1 and 3 are disposed at the ends of the diagonal 16, and the second and fourth hydrophones 2 and 4 are disposed at the ends of the diagonal 17.

The sonobuoy or supporting structure 15 and one of the first, second, third and fourth hydrophones 1, 2, 3 and 4, respectively, may be orientated with respect to the magnetic North by fixing and aligning one of the four hydrophones 1, 2, 3 and 4, namely the first hydrophone 1, with a north-seeking device such as a permanent bar magnet 50. Accordingly then, the second, third and fourth hydrophones, 2, 3 and 4 are relatively orientated in West, South and East quadrants respectively.

The first, second, third and fourth hydrophones 1, 2, 3 and 4 are evenly matched and have substantially the same omnidirectional characteristics and sensitivities. The first, second, third and fourth hydrophones 1, 2, 3 and 4 have electrical outputs $a_1$; $a_2$; $a_3$ and $a_4$ which are applied by way of conductors 18, 19, 21 and 22 respectively to a first adder 23 which may be, for example, a transformer.

The first adder 23 sums the electrical outputs $a_1$; $a_2$; $a_3$ and $a_4$ of the first, second, third and fourth hydrophones 1, 2, 3 and 4, respectively, to derive an A.C. electrical reference signal or clock standard at terminal 24, which reference signal appears to emanate from an imaginary or virtual hydrophone 25 located at the point of intersection of the diagonals 16 and 17 of the square 15.

The point of intersection of the diagonals 16 and 17 may be considered as the center of the hydrophone array consisting of the first, second, third and fourth hydrophones 1, 2, 3 and 4 respectively and the virtual hydrophone 25. Each of the first, second, third and fourth hydrophones 1, 2, 3 and 4 respectively in the array is equally spaced one-half of the fractional part ($d$) of the wavelength ($n$) or $d/2$ from the virtual hydrophone 25. The spacing between the virtual hydrophone 25 and each of the first, second, third and fourth hydrophones 1, 2, 3 and 4 would thus be a quarter wavelength $\lambda/4$ for the above given example.

The first, second, third and fourth hydrophones 1, 2, 3 and 4, respectively, are spaced at ninety degree (90°) intervals about the virtual hydrophone 25 at bearing points 0, $\pi/2$, $\pi$, and $3/2\pi$ respectively. This geometrical arrangement of the first, second, third and fourth hydrophone 1, 2, 3 and 4, respectively, and the virtual hydrophone 25 provide an acoustic delay and electrical phase relationship between the electrical outputs of the first, second, third and fourth hydrophones 1, 2, 3 and 4, respectively, which acoustic delay and electrical phase relationship may be referenced to the output or reference signal of the virtual hydrophone 25. The electrical output or reference signal of the virtual hydrophone 25 may be referenced, for convenience, to "time zero" so that a plane wavefront of compressional wave energy, for example, arriving at any one of the first, second, third and fourth hydrophones 1, 2, 3 and 4, respectively, ahead of the virtual hydrophone 25 will be considered as having a positive time ($+t$) factor with respect to "time zero" and the A.C. electrical output of those hydrophones will have a positive (or leading) electrical phase relationship with respect to the electrical output or the reference signal of the virtual hydrophone 25. Conversely, those hydrophones in the array which receive the plane wave front of compressional wave energy after the virtual hydrophone 25 will have a negative time ($-t$) factor with respect to "time zero" and the A.C. electrical output of those hydrophones will have negative (or lagging) phase relationship with respect to the electrical output of the virtual hydrophones. In other words, the electrical output of those hydrophones receiving sound energy ahead of the virtual hydrophone 25 will have a positive A.C. electrical phase angle and will lead the electrical output of the virtual hydrophone 25. On the other hand, those hydrophones receiving sound energy after the virtual hydrophone 25 will have a negative A.C. electrical phase angle and will lag the electrical output of the virtual hydrophone 25.

The electrical outputs $a_1$; $a_3$ from the first and third hydrophones 1 and 3, respectively, are applied to a first difference amplifier 30 by way of conductors 18 and 22 and conductors 18a and 22a which are connected to conductors 18 and 22 respectively at junctions 27 and 28 respectively. The electrical output $b_1$ from the first difference amplifier 30, which output $b_1$ is equal to the difference between the electrical outputs $a_1$, $a_3$ of the first and third hydrophones 1 and 3, is applied to a first input 31 of a second adder 35. The first difference amplifier 30 algebraically substracts the electrical output $a_3$ of the third hydrophone 3 from the electrical output $a_1$ of the first hydrophone 1. This may be expressed algebraically as ($a_1-a_3$) is equal to $b_1$.

The second and fourth hydrophones have electrical outputs $a_2$ and $a_4$ respectively. The electrical outputs $a_2$, $a_4$ from the second and fourth hydrophones 2 and 4 respectively are applied to a second difference amplifier 34 by way of conductors 19 and 21 and conductors 19a and 21a which are connected to conductors 19 and 21 respectively at junctions 32 and 33 respectively. The second difference amplifier 34 has an electrical output $b_2$, which is equal to the difference between the electrical outputs $a_2$, $a_4$ of the second and fourth hydrophones 2 and 4 respectively. The electrical output $b_2$ of the second difference amplifier 34 is applied to an input 36 of a 90° phase shifter 37.

The 90° phase shifter 37, phase shifts the electrical output $b_2$ from the second difference amplifier 34 by 90° to derive a phase shifted output $b_3$. The 90° phase shifted difference output, $b_3$ from the second difference amplifier 34 is applied to a second input 45 of a second added 35. The second added 35 may be, for example, a transformer.

The second adder 35 vectorially sums the electrical outputs $b_1$ and $b_3$ applied to its first and second inputs 31 and 45 to derive a vector resultant signal $b_4$ which is representative of the look angle or the angle of incidence $\theta$ of the second path or acoustic energy with respect to the virtual hydrophone 25. The vector resultant signal $b_4$ of the second adder 35 may be transmitted by a radio link, not shown, and applied to a phase detector 40 at input terminal 38 and compared with the electrical output or referenced signal of the first adder 23. The output of the phase detector 40 is applied to a utilization circuit 41 through input 42 of the utilization circuit 41. The utilization circuit 41 may include a display system such as a graph recorder or an oscilloscope such as a "B" type oscilloscope 50 (FIG. 3). The screen of the oscilloscope could be divided in quadrants along the horizontal axis to indicate direction and angle of incidence $\theta$. The output from the phase detector 40 at terminal 42 is applied to the horizontal deflection electrodes of the oscilloscope 50 at input terminal 42, and the output of the first adder 23 may be applied to input terminal 24 of the oscilloscope 50 for intensity to derive a signal such as a spot 52 to indicate the angle of incidence $\theta$ along the horizontal axis of the screen 51 of the oscilloscope 50.

The operation of the acoustic system 10 may be better understood when taken together with a study of a mathematical analysis of the acoustic system 10. The acoustic delay, or time ($t$) and the electrical phase relationship between the electrical outputs $a_1$, $a_2$, $a_3$ and $a_4$ of the first, second, third and fourth hydrophones 1, 2, 3 and 4 respectively with respect to electrical output of the virtual hydrophone 25 may be shown by equating the distances traveled by a plane wave front or compressional wave (FIG. 2) of sound energy across the hydrophone array. The hydrophones first excited by the plane wave front ahead of the virtual hydrophone 25 will have a positive phase angle and time ($+t$) with respect to the output of the virtual hydrophone 25, and those hydrophones in the array excited after the virtual hydrophone 25 will have a negative phase angle and time ($-t$) with respect to the virtual hydrophone 25 as was mentioned previously. For example, for a plane wave front having a look angle or angle of incidence $\theta$ as shown in FIG. 2, the first hydrophone 1 will be excited by the plane wavefront at a distance $d_1$ ahead of the virtual hydrophone 25. The distance $d_1$ is the trigonometric function of the look angle or angle of incidence $\theta$ through which the plane wavefront travels. The distance $d_1$ may be expressed as:

$$d_1 = \frac{d}{2}\cos\theta$$

where:

$\theta$ is the angle of incidence $\theta$; and
$d/2$ is the actual distance the first hydrophone 1 is away from the virtual hydrophone 25.

The distance $d_1$ is considered as being positive since the first hydrophone 1 is excited ahead of or before the virtual hydrophone 25 is excited. In a like manner the distances $d_2$, $d_3$, $d_4$ at which the other three hydrophones, namely the second, third and fourth hydrophones 2, 3 and 4, respectively, are excited by the plane wavefront and are described as follows:

$$d_2 = \frac{d}{2} \sin \theta$$

$$d_3 = -\frac{d}{2} \cos \theta$$

$$d_4 = -\frac{d}{2} \sin \theta$$

The distance $d_2$ is positive since the second hydrophone 2 is also excited by the plane wave ahead of the virtual hydrophone 25. The distances $d_3$ and $d_4$ of the third and fourth hydrophones are considered as being negative since the third and fourth hydrophones 3 and 4 are excited by the plane wavefront after the virtual hydrophone 25 has been excited.

The distances $d_1$, $d_2$, $d_3$ and $d_4$ of the first, second, third and fourth hydrophones 1, 2, 3 and 4 respectively may be compared to the wavelength $\lambda$ of the acoustic energy received by the first, second, third and fourth hydrophones 1, 2, 3 and 4 and the virtual hydrophone 25. By comparing each of the distances $d_1$, $d_2$, $d_3$ and $d_4$ with the wave length $\lambda$ the first, second, third and fourth phase angles $\beta_1$, $\beta_2$, $\beta_3$ and $\beta_4$ resspectively can be derived for the electrical outputs $a_1$, $a_2$, $a_3$ and $a_4$ of the first, second, third and fourth hydrophones 1, 2, 3 and 4 respectively, which phase angles $\beta_1$, $\beta_2$, $\beta_3$ and $\beta_4$ are referenced to the the output of the virtual hydrophone 25. The phase angles $\beta_1$, $\beta_2$, $\beta_3$ and $\beta_4$ of the first, second, third and fourth hydrophones may each be expressed as follows:

$$\frac{\beta_1}{2\pi} = \frac{d_1}{\lambda}$$

or $$\beta_1 = \frac{2\pi d_1}{\lambda}$$

where:

$\beta_1$ = electrical phase angle of the output of the first hydrophone 1,
$\lambda$ = wavelength of the sound energy.

For the first distance $d_1$, it can be seen by substituting the function of $d_1$ that the phase angle $\beta_1$ may be equated as follows:

$$\beta_1 = \frac{2\pi d_1}{\lambda}$$

$$\beta_1 = \frac{2\pi d \cos \theta}{2\lambda}$$

$$\beta_1 = \frac{\pi d \cos \theta}{\lambda}$$

In a like manner the electrical phase angles $\beta_2$, $\beta_3$ and $\beta_4$ of the electrical outputs of the second, third and fourth hydrophones 2, 3 and 4 respectively may also be written as follows:

$$\beta_2 = \frac{2\pi d_2}{\lambda}$$

$$\beta_2 = \frac{\pi d \sin \theta}{\lambda}$$

$$\beta_3 = \frac{-2\pi d_3}{\lambda}$$

$$\beta_3 = \frac{-\pi d \cos \theta}{\lambda}$$

$$\beta_4 = \frac{-2\pi d_4}{\lambda}$$

$$\beta_4 = \frac{-\pi d \sin \theta}{\lambda}$$

The size of the array, consisting of the first, second, third and fourth hydrophones 1, 2, 3 and 4, may be expressed in terms of the signal frequency such that an inverse fractional wavelength, $(n)$ may be expressed as follows:

$$n = \frac{\lambda}{d}$$

or $$d = \frac{\lambda}{n}$$

The phase angles $\beta_1$, $\beta_2$, $\beta_3$ and $\beta_4$ may then be expressed as follows:

$$\beta_1 = \frac{\pi}{n} \cos \theta$$

$$\beta_2 = \frac{\pi}{n} \sin \theta$$

$$\beta_3 = \frac{-\pi}{n} \cos \theta$$

and $$\beta_4 = \frac{-\pi}{n} \sin \theta$$

The first, second, third and fourth hydrophones 1, 2, 3 and 4 have substantially the same sensitivity and are substantially evenly matched so that the output signal of each of the first, second, third and fourth hydrophones, 1, 2, 3 and 4, have peak amplitudes $A_1$, $A_2$, $A_3$ and $A_4$ respectively, which are all equal to each other. The output signals $a_1$, $a_2$, $a_3$ and $a_4$ of each of the first, second, third and fourth hydrophones 1, 2, 3 and 4 respectively are referenced to the array center or the virtual hydrophone 25.

The amplitude of the electrical output $a_1$ of the first hydrophone 1 may be expressed as:

$$a_1 = A_1 \underline{/\beta_1}$$

or expressed vectorially as $$a_1 = A_1 \cos\left(\frac{\pi}{n} \cos \theta\right) + jA_1 \sin\left(\frac{\pi}{n} \cos \theta\right)$$

The above relationship is derived from the equation:

$$V \underline{/\Phi} = V \cos \Phi + j \sin \Phi$$

where:

$V$ = voltage amplitude; and $\underline{/\Phi}$ = phase angle

It also follows that the amplitudes of the electrical outputs $a_2$, $a_3$ and $a_4$ of the second, third and fourth hydrophones 2, 3 and 4 respectively may also be expressed in the same manner as follows:

$$a_2 = A_2 \underline{/\beta_2}$$

or $$a_2 = A_2 \cos\left(\frac{\pi}{n} \sin \theta\right) + jA_2 \sin\left(\frac{\pi}{n} \sin \theta\right)$$

also $$a_3 = A_3 \underline{/\beta_2}$$

$$a_3 = A_3 \cos\left(-\frac{\pi}{n} \cos \theta\right) + jA_3 \sin\left(-\frac{\pi}{n} \cos \theta\right)$$

In like manner:

$$a_4 = A_4 \underline{/\beta_4}$$

$$a_4 = A_4 \cos\left(-\frac{\pi}{n} \sin \theta\right) + jA_4 \sin\left(-\frac{\pi}{n} \sin \theta\right)$$

However, since $$\cos(-\theta) = \cos \theta$$

and $$\sin(-\theta) = -\sin \theta$$

By substitution $a_3$ and $a_4$ can be expressed as follows:

$$a_3 = A_3 \cos\left(\frac{\pi}{n} \sin \theta\right) - jA_3 \sin\left(\frac{\pi}{n} \cos \theta\right)$$

and $$a_4 = A_4 \cos\left(\frac{\pi}{n} \sin \theta\right) - jA_4 \sin\left(\frac{\pi}{n} \sin \theta\right)$$

The electrical outputs $a_1$, $a_2$, $a_3$, $a_4$ of the first, second, third and fourth hydrophones 1, 2, 3 and 4 respectively, have all been referenced to the array center or virtual hydrophone 25 so that the acoustic delay of the time $(t)$ of acoustic energy in traveling to the various hydrophones in the array has been introduced in the above expressions or equations by the distances $d_1$, $d_2$, $d_3$ and $d_4$ respectively.

The electrical signal outputs $a_1$ and $a_3$ of the first and third hydrophones 1, 3 are applied to the first difference amplifier 30, which vectorially subtracts the electrical output $a_3$ of the third hydrophone 3 from the electrical output $a_1$ of the first hydrophone 1. Expressed in equation form the difference output $(b_1)$ of the first difference amplifier can be expressed as follows:

$$\vec{b}_1 = \vec{a}_1 - \vec{a}_3$$

or substituting $$b_1 = (A_1 - A_3) \cos\left(\frac{\pi}{n} \cos \theta\right) + j(A_1 + A_3) \sin\left(\frac{\pi}{n} \cos \theta\right)$$

The difference output signal $b_1$ from the first difference amplifier 30 is applied to the second adder 35 through input terminal 31.

The electrical outputs $a_2$ and $a_4$ of the second and fourth hydrophones 2 and 4 respectively are applied to the second difference amplifier 34, which vectorially subtracts the electrical signal output $a_4$ of the fourth hydrophone 4 from the electrical signal output $a_2$ of the second hydrophone 2. The output $b_2$ of the second difference amplifier 34 can be expressed as follows:

$$\vec{b}_2 = \vec{a}_2 - \vec{a}_4$$

or by substitution expressed as follows:

$$b_2 = (A_2 - A_4) \cos\left(\frac{\pi}{n} \sin \theta\right) + j(A_2 + A_4) \sin\left(\frac{\pi}{n} \sin \theta\right)$$

The output $b_2$ of the second difference amplifier 34 is applied to the 90° phase shifter 37 through input terminal 36. The 90° phase shifter 37 phase shifts the output $b_2$ of the second difference amplifier 34 by ninety degrees (90°) to derive a phase shifted signal output $b_3$ which is applied to the second added 35 through a second input terminal 45.

The phase shifted output $b_3$ of the 90° phase shifter 37 can be expressed as follows:

$$b_3 = jb_2$$

or $$b_3 = -(A_2 + A_4) \sin\left(\frac{\pi}{n} \sin \theta\right) + j(A_2 - A_4) \cos\left(\frac{\pi}{n} \sin \theta\right)$$

The 90° phase shifter 37 is employed so that the output signals $b_1$ and $b_3$ of the first difference amplifier 30 and the phase shifted output from the 90° phase shifter 37 may be vectorially added to derive a vector resultant signal, $b_4$ which may be expressed as follows:

$$\vec{b}_4 = \vec{b}_1 + \vec{b}_3$$

which can also be expressed as follows:

$$b_4 = (A_1 - A_3) \cos\left(\frac{\pi}{n} \cos \theta\right) - (A_2 + A_4) \sin\left(\frac{\pi}{n} \sin \theta\right) + j\left[(A_1 + A_3) \sin\left(\frac{\pi}{n} \cos \theta\right) + (A_2 - A_4) \cos\left(\frac{\pi}{n} \sin \theta\right)\right]$$

The vector resultant signal, $b_4$ is expressed as a function of the look angle or angle of incidence $\theta$ of the acoustic energy impinging upon the first, second, third and fourth hydrophones, 1, 2, 3 and 4, through the sound path.

The peak amplitudes $A_1$, $A_2$, $A_3$ and $A_4$ are representative of the sensitivities of the first, second, third and fourth hydrophones 1, 2, 3 and 4 respectively.

The vector resultant signal $b_4$ from the second adder 35 has an amplitude $A_b$ which may be expressed vectorially by adding the squares of output signals $b_1$ and $b_3$ and obtaining the square root of the sum as follows:

$$A_b = \left\{\left[(A_1 - A_3)\cos\left(\frac{\pi}{n}\cos\theta\right) - (A_2 + A_4)\sin\left(\frac{\pi}{n}\sin\theta\right)\right]^2 + \left[(A_1 + A_3)\sin\left(\frac{\pi}{n}\cos\theta\right) + (A_2 - A_4)\cos\left(\frac{\pi}{n}\sin\theta\right)\right]^2\right\}^{1/2}$$

Since the first, second, third and fourth hydrophones, 1, 2, 3 and 4 respectively have substantially matched characteristics and sensitivities, the amplitude of the vector resultant signal may be expressed as:

$$A_b = \left[4A^2 \sin^2\left(\frac{\pi}{n}\sin\theta\right) + 4A^2 \sin^2\left(\frac{\pi}{n}\cos\theta\right)\right]^{1/2}$$

By factoring, the vector resultant signal, $A_b$ may be reduced to the equation:

$$A_b = 2A\left[\sin^2\left(\frac{\pi}{n}\sin\theta\right) + \sin^2\left(\frac{\pi}{n}\cos\theta\right)\right]^{1/2}$$

The vector resultant signal $b_4$ from the second adder 35 as was mentioned previously and herein described has an amplitude of $A_b$ and a phase angle $\Phi_b$ which may be expressed by:

$$\Phi_b = \tan^{-1}\left[\frac{(A_1 + A_3)\sin\left(\frac{\pi}{n}\cos\theta\right) + (A_2 - A_4)\cos\left(\frac{\pi}{n}\sin\theta\right)}{(A_1 - A_3)\cos\left(\frac{\pi}{n}\cos\theta\right) - (A_2 + A_4)\sin\left(\frac{\pi}{n}\sin\theta\right)}\right]$$

Since the first, second, third and fourth hydrophones 1, 2, 3 and 4 respectively have substantially the same sensitivities, the phase angle $\Phi_b$ can be reduced to the equation:

$$\Phi_b = \tan^{-1}\left(-\frac{\sin\left(\frac{\pi}{n}\cos\theta\right)}{\sin\left(\frac{\pi}{n}\sin\theta\right)}\right)$$

The vector resultant signal $b_4$ thus has an amplitude $A_b$ and a phase angle $\Phi_b$ which is referenced to the array center or to the electrical output or reference signal of the virtual hydrophone 25. The vector resultant signal $b_4$ may be expressed as $$A_b / \Phi_b$$

The vector resultant signal $b_4$ and the referenced signal from the first adder 23 are applied to the phase detector 40. As was mentioned previously, the reference signal has been given a "zero time" or phase relationship with respect to the vector resultant signal by virtue of the apparent position of the virtual hydrophone 25; that is, the virtual hydrophone 25 is disposed at the array center and receives compressional wave energy either before or after the other hydrophones in the array. The electrical output of the phase detector 40 is a directional signal which has the same amplitude $A_b$ and phase angle $\Phi_b$ as the vector resultant signal $b_4$. Since the first hydrophone 1 is orientated with respect to North, or 0° bearing, the phase angle $\Phi$ or its equivalent, the angle of incidence $\theta$ designates the bearing or direction of the sound path (FIG. 2).

The output or directional signal of the phase detector 40 is applied to a utilization circuit 41 which may include a chart recorder or an oscilloscope 50 as shown in FIG. 3.

The directional signal of the phase detector 40 is applied to the input of the oscilloscope 50 to produce a horizontal deflection, while the reference signal from the first adder 23 is used to intensity modulate the display of the oscilloscope 50.

The display of the oscilloscope 50 may be a spot whose intensity is proportional to the signal strength of the reference signal, and the horizontal position of the spot is determined by the phase difference between the vector resultant signal $b_4$ and the reference signal. The oscilloscope 50 may have a screen 51 which is divided horizontally into quadrants and degrees, namely 360° from left to right so as to visually indicate the bearing or azimuth of the path of the acoustic energy traveling through the medium, that is, the angle of incidence.

The utilization circuit 41 may also be a chart recorder, not shown, which will also visually indicate the bearing or azimuth of the acoustic energy relative to a given point. The point is defined by the imaginary or virtual hydrophone 25. The recorder includes a pen which traverses a moving graph paper and indicates the angle of incidence $\theta$ by its horizontal deflection in response to the phase difference between the vector resultant signal and the reference signal as determined by the phase detector 40 as described above for the oscilloscope 50.

From the foregoing description it will be apparent that there has been provided an improved acoustic system for the determination of the bearing of acoustic energy arriving along a sound path and the displaying of a derived sonic signal which represents the direction or bearing and magnitude of the sound path or incident acoustic energy. Although one embodiment of the acoustic system 10 has been described, it will be appreciated that variations and modifications therein within the scope of the invention will undoubtedly become apparent to those skilled in the art. For example, the electrical outputs $b_1$ and $b_2$ of the first and second difference amplifiers 30 and 34 respectively may each be phase shifted 45° by two phase shifters instead of phase shifting only the output of the second difference amplifier 34 by the 90° phase shifter 37. Accordingly, the foregoing description should be taken merely as illustrative and not in any limiting sense.

What is claimed is:

1. An acoustic system comprising
   (a) a hydrophone array including four omnidirectional hydrophones,
   (b) mounting means for supporting each of said four hydrophones at different corners of an imaginary square having diagonals the lengths of which are fractional parts of a given wavelength at a given operating frequency,
   (c) adder means connected to each of said four hydrophones for deriving a reference signal when all of said hydrophones are excited by acoustic energy,
   (d) first and second signal combining means, each connected to a pair of said hydrophones which are disposed along each of said diagonals of said square to derive first and second outputs respectively therefrom,
   (e) third means for phase shifting one of said first and second outputs from said first and second combining means respectively by ninety degrees and adding the resultant output therefrom to the other one of said first and second combining means outputs to derive a vector resultant signal therefrom,
   (f) phase detector means connected to said third means and said adder means for producing a bearing indicative signal which is a function of said reference signal and said vector resultant signal therefrom, and
   (g) utilization means connected to said phase detector means and said adder means for displaying said bearing signal from said phase detector means.

2. The invention defined in claim 1 wherein said utilization means is an oscilloscope.

3. The invention defined in claim 1 wherein said four hydrophones have substantially equal sensitivities.

4. An acoustic system for determining the direction of an underwater sound source comprising
   (a) a hydrophone array comprising first, second, third and fourth hydrophones,
   (b) means for supporting said first, second, third and fourth hydrophones at first, second, third and fourth different corners of an imaginary square having diagonals the lengths of which are a fractional part of a given wavelength,
   (c) first adder means connected to said first, second, third and fourth hydrophones for deriving a reference signal simulating the output of an imaginary hydrophone disposed at the intersection of said diagonals of said square whereby said first, second, third and fourth hydrophones are acoustically separated with respect to said imaginary hydrophone so that each of said first, second, third and fourth hydrophones have an electrical signal output which varies in phase correspondingly in response to a given acoustic signal traveling along a given direction through said hydrophone array,
   (d) said first and third hydrophones being disposed along one of said diagonals,
   (e) said second and fourth hydrophones being disposed along the other one of said diagonals,
   (f) first difference amplifier means for combining the outputs of said first and third hydrophones to derive a first output signal,
   (g) second difference amplifier means for combining the outputs of said second and fourth hydrophones to derive a second output signal,
   (h) third means connected to said first and second difference amplifier means for phase shifting said second difference output signal by ninety degrees and adding the resultant phase shifted second difference output signal with said second difference output signal to derive a vector resultant signal therefrom,
   (i) a phase detector connected to said first adder means and said third means for producing an output signal in response to said reference signal and said vector resultant signal, and
   (j) display means connected to said first adder means and said phase detector means for displaying said phase detector output signal.

5. The invention defined in claim 4 further including a direction seeking device coupled to said support means and aligned with one of said first, second, third and fourth hydrophones for aligning said hydrophone array with respect to a given direction.

6. An acoustic system for determining the angle of incidence of acoustic energy to a given point, the combination comprising
   (a) a hydrophone array comprising first, second, third and fourth hydrophones,
   (b) means for supporting said first, second, third and fourth hydrophones on four corners of an imaginary square having diagonals which have a length equal to a fractional part of a given wavelength of said acoustic energy,
   (c) said first and third hydrophones being disposed along one of said diagonals,
   (d) said second and fourth hydrophones being disposed along the other one of said diagonals,
   (e) first adder means connected to said first, second, third and fourth hydrophones for deriving a reference signal simulating the output of an imaginary hydrophone disposed at the intersection of said diagonals of said square so that said imaginary hydrophone appears to be disposed equidistant from said first, second, third and fourth hydrophones, said intersection defining said given point,
   (f) each of said first, second, third and fourth hydrophones having an output signal which varies in phase with respect to said reference signal as a function of said angle of incidence of said acoustic energy, (g) a first difference amplifier for subtracting the outputs of said first and third hydrophones from each other to derive a first difference signal, (h) a second difference amplifier for subtracting the outputs of said second and fourth hydrophones from each other to derive a second difference signal, (i) means connected to said first and second difference amplifier for phase shifting and vectorially adding said first and second difference signals to derive a vector resultant signal, (j) a phase detector connected to said first adder means and said last named means for producing a distinctive directional signal which is a function of said angle of incidence of said acoustic energy at said given point, and (k) means connected to said phase detector and said first adder means for displaying said distinctive directional signal.

7. The invention according to claim 6 further including a north-seeking device coupled to said support means for orientating said first, second, third and fourth hydrophones.

No references cited.

CHESTER L. JUSTUS, *Primary Examiner.*

R. A. FARLEY, *Assistant Examiner.*